Jan. 12, 1971 D. C. SKILLEN 3,554,064
SERVO CONTROLLED DIMENSION STABILIZER FOR MACHINE TOOLS
Filed March 21, 1969 2 Sheets-Sheet 2

INVENTOR.
DAWSON C. SKILLEN
BY
Angus & Mon
ATTORNEYS.

United States Patent Office 3,554,064
Patented Jan. 12, 1971

3,554,064
SERVO CONTROLLED DIMENSION STABILIZER FOR MACHINE TOOLS
Dawson C. Skillen, Covina, Calif., assignor to Textron, Inc., Covina, Calif., a corporation of Delaware
Filed Mar. 21, 1969, Ser. No. 809,141
Int. Cl. B23b 3/28; B24b 17/00
U.S. Cl. 82—14
6 Claims

ABSTRACT OF THE DISCLOSURE

A servo controlled stabilizer for maintaining constant a dimension of a machine tool, an example being the axial spacing between the stylus of the tracer and the cutting tool which it controls. This is accomplished by providing a temperature insensitive rod along the length of the mechanism, the rod being anchored at one end to the body whose length is to be controlled and supported at its other by a motion sensitive element such as a strain gauge also mounted to body, the output of the strain gauge being utilized to operate a heater or cooler for maintaining the dimension of the spacing at a stable condition by controlling the temperature of the body.

SPECIFICATION

This invention relates to a means for stabilizing a critical length in a machine tool, one example being the spacing between a cutting tool and the stylus of a tracer in a tracer controlled machine tool.

Hydraulically actuated tracer controlled machine tools utilize fluids for their control which are circulated through the system at varying rates depending on the output of the machine itself. This can of course have an effect on the temperature of the device and as the temperature changes the distance between the cutting tool and the stylus of the tracing valve can change. This can change the contour of the work piece. There are other causes of changes in temperatures, such as in the ambient temperature of the room in which the tool is located which have similar effect in changing the said spacing, and these other causes are effective as to hydraulic and to othen types of tracer controlled tools.

This invention has broad application in machine tools and the examples given are not by way of limitation, but only of illustration.

Heretofore attempts have been made to overcome the foregoing adverse effects by maintaining the temperature of the motive fluid at a constant value, and also trying to maintain the temperature of the room reasonably constant. However, these have not been particularly successful, and relatively important changes in dimensions of work pieces have been noticed.

It is an object of this invention to provide a servo system which heats or cools the device to maintain at a constant values the spacing between two points on it.

According to this invention, the machine tool is provided with a thermally insensitive element such as an Invar rod which is anchored at one end to a body at one end of the dimension, and also at its other end, but there through a dimensionally sensitive device such as a strain gauge whose output is applied to a heater or cooler that brings the temperature of the device to a value which will result in maintenance of the predetermined length.

The invention will be fully understood from the following detailed description of the accompanynig drawings in which.

Figure 1:
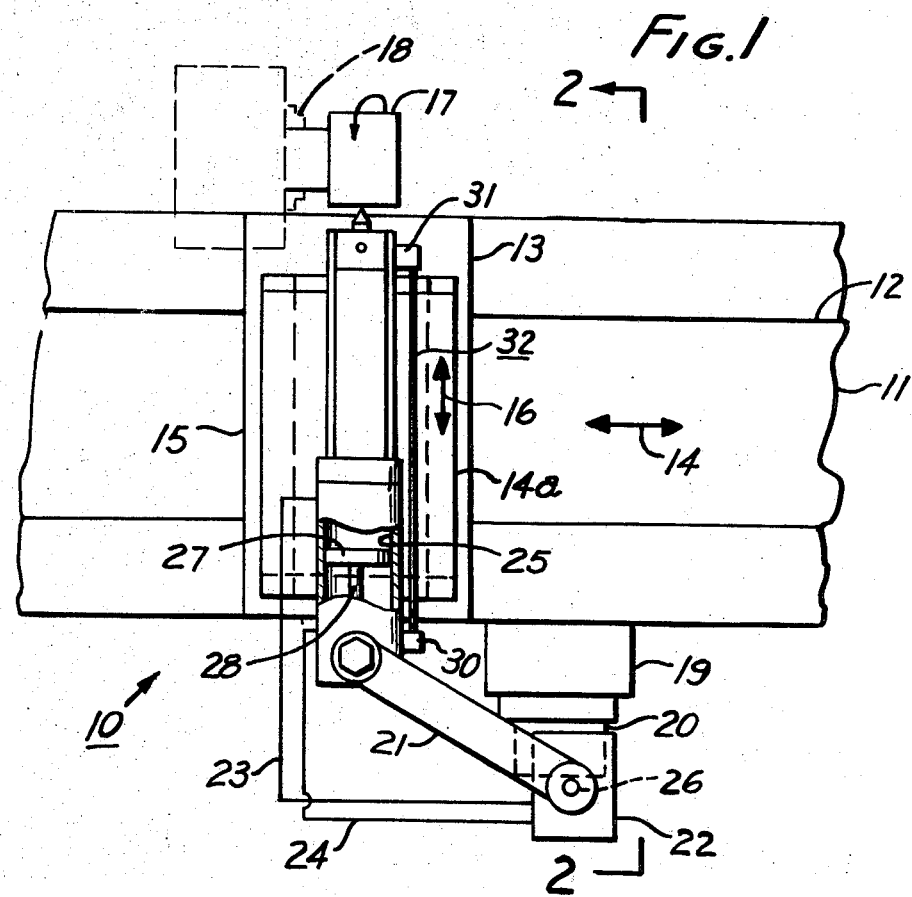
FIG. 1 is a partial plan view of a machine tool incorporating the invention.

As an example of the invention, a tracer controlled machine tool 10 is shown in FIG. 1 incorporating the presently preferred embodiment. The machine tool includes a bed 11 having a first slideways 12 mounting a slide 13 (sometimes called "base") for motion along a longitudinal axis 14. Slide member 13 in turn carries a slide way 14a which mounts a slide 15 for sliding motion along cross axis 16. It is the purpose of the control to move slide 15 along cross axis 16 to cut a desired configuration in a work piece 17 as slide 13 is moved along the longitude and the axis 14. The workpiece is turned by a power driven chuck 18 which holds the same. A cutting tool 18a is carried by the slide 15.

The control also includes a template rail 19 which is mounted to the bed. This rail carried a template 20 whose configuration is to be duplicated in the workpiece.

The slide carried an arm 21 which may be angularly adjustable at the end of which there is supported a tracer valve 22 of conventional type. This may conveniently be a tracer valve of the type shown in Paul J. Weaver Pat. No. 3,035,807, issued May 22, 1962, entitled Tracer Valve. It may instead be another type, such as an electrical or electronic type. A characteristic of such a tracer valve is the inclusion of a four-way valve which is adaptable to control the supply of hydraulic fluid through lines 23, 24 to opposite sides of a hydraulic cylinder 25 carried by and attached to (or integral with) the slide. The adjustment of the four-way valve which attends to this control supply is caused by motion of a stylus 26 in accordance with known techniques.

The stylus is intended to trace along the contour of the template in order to cause the desired tool movement. According to well known constructions, a piston 27 is placed inside the hydraulic cylinder between the entrance ports of the two lines, mounted to a rod 28 which is anchored to slide member 13. Therefore injecting fluid under pressure on one side of the piston and withdrawing it on the other will cause the slide 15 to move along the cross axis in response thereto.

It is evident that the axial spacing along cross axis 16 is critical because if it changed and the distance does not change equally between the workpiece and the template edge, then a part of different size would be cut by the tool. Cylinder 25 and slide 15 are typically materials of dissimilar coefficients of expansions and since heating is supplied to cylinder 25 by the hydraulic oil, may tend to have a substantially different temperature at times. There is thus no fixed temperature relationship between the two spacings, and it is therefore necessary to maintain the tracer assembly at a specific length if predictable results are desired. Such is the purpose of this invention. It is obvious that the control of the dimensions can be used to compensate for a change of dimension of some other part of the machine structure such as the lathe bed.

Figure 2:
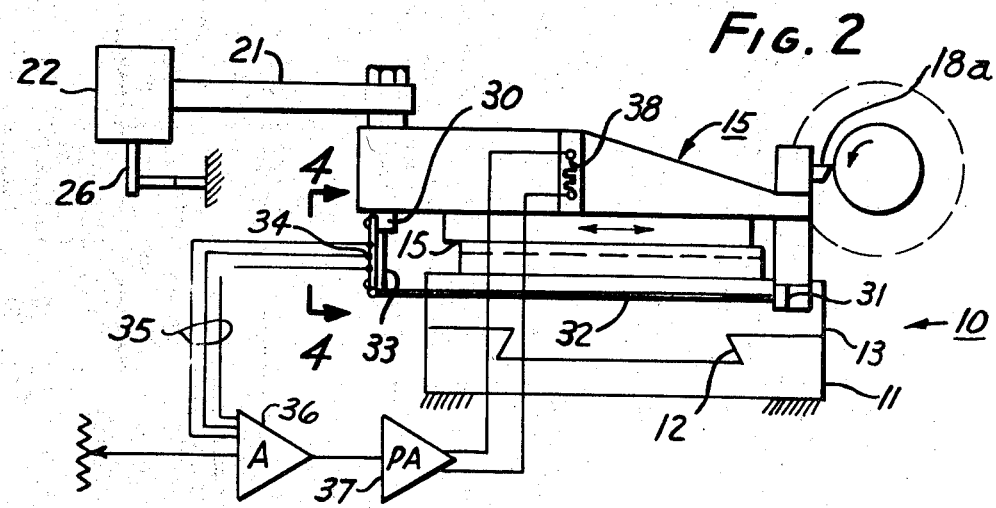
FIG. 2 is a view taken at line 2—2 of FIG. 1.

To accomplish the foregoing purpose an anchor block 30 is attached to the cylinder end of slide 15, and another anchor block 31 is also attached to the other end of slide 15. A temperature insensitive rod 32, which can conveniently be made from the alloy known as Invar, is attached to and cantilevered from anchor block 31. It extends parallel to cross axis 16 and is joined at its other end to a flexure 33 which in turn is held by anchor block 31. The flexure flexes in the plane of FIG. 2. To the flexure is mounted a motion sensitive element such as a bonded strain gauge 34. Bending of the flexure 33 will cause movement in strain gauge 34 and change its resistance according to known techniques. This signal, which is essentially the output of a linear displacement transducer, is utilized to control a heater, (or if preferred, a cooler) yet to be described. It will be understood that other displacement sensitive elements such as LVDT's or switches may be used instead of a strain gauge. However, switches will ordinarily have a greater dead region between switching conditions than would be desirable for this situation. Therefore, strain gauges and the like will ordinarily be preferred.

The signal from the strain gauge is conducted by conductors 35 to an amplifier 36, the output of which is applied to a power amplifier 37, which power amplifier supplies power to a heater 38 which is embedded or otherwise thermally conductibly attached to the slide. The details of the heater require no detailed disclosure here except that its elements may be embedded or attached to the slide at places most likely to give optimum heat conduction in the device.

It will be noted that there need be no refrigerant capability provided if the system is operated at a temperature above ambient in order that a controllable condition will reliably exist. It would be feasible but more costly to use a thermoelectric heater or a water jacket.

Figure 3:
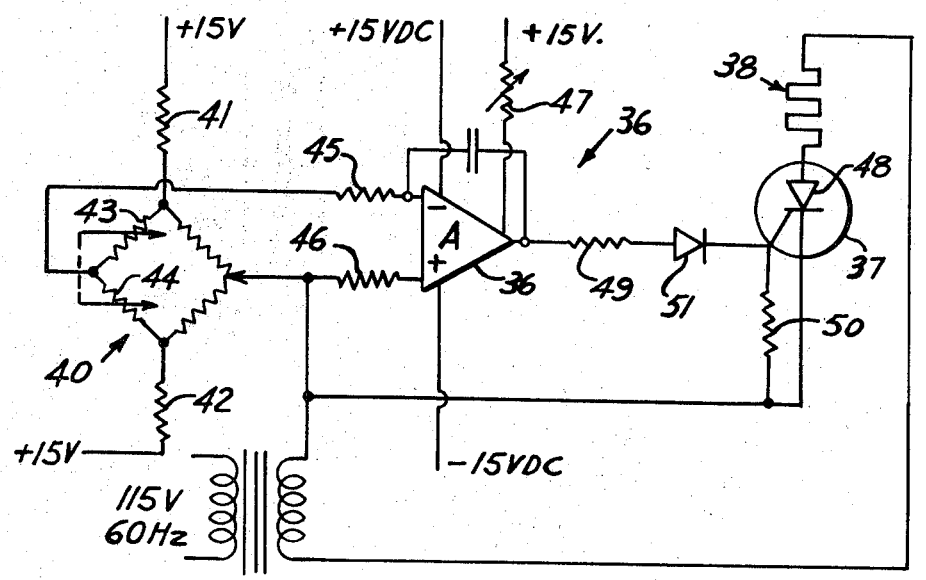
FIG. 3 is a circuit diagram showing a portion of the device of FIG. 1.
Figure 4:
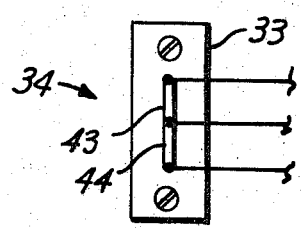
FIG. 4 is a view of a fragment the device of FIG. 2 taken at line 4—4 therein.

A simple circuit for the control of the heater is shown in FIG. 3. Numerous other types of control systems may readily be used instead, this simply being one illustrative example. Bridge circuit 40 is supplied with current through two resistors 41, 42. Resistors 43, 44 constitute the elements of strain gauge 34. The bridge construction thereby provides a signal proportional to the motion in flexure 33 which in turn in responsive to the maintenance of the measured dimension which it is desired to control.

Resistors 45, 46 couple the signal to amplifier 36. In this case a feedback resistor is not used, and an output signal is achieved which can transfer from negative saturation to positive saturation with a change in slide length of as little as 0.00003 inch. Resistor 47 provides an offset adjustment should it be necessary to the operation of the selected amplifier, although it does not form a necessary part of the usual system.

A silicon controlled rectifier 48 comprises the power amplifier. It will conduct only when the voltage applied to heater 38 is positive and a positive signal is also applied to its gate. Resistors 49, 50 along with rectifier 51 supply the turn-on signal to the gate. This circuit causes minimum power dissipation in the control circuitry. Power is supplied through a transformer 52, which if it were supplying full wave rectified voltage would apply double the power. In the present circuit, however, only half wave rectified voltage is utilized.

The details of the circuit elements and the circuits themselves are well known to persons in the electronic art, and require no further disclosure here. This circuit, and others functionally equivalent to it, are readily found in standard references on the subject.

It will now be observed that when the temperature in the element falls, there will be a shrinkage of slide 15, but not of the Invar rod. This will cause a bending in flexure 33 which will cause a signal in the bridge circuit which in turn will be amplified, and then through the operation of the power amplifier 37 will operate heater 38 and heat the slide, which will continue until the slide has grown enough that the flexure has been returned to its unflexed or other reference condition, at which time the heater is shut off. This provides a simple means for maintaining the dimensional stability of the machine tool as to thermal effects.

It will be further noted that the rod is anchored at points 30 and 31 on the same body, and that it is changes in the length between these points which provides the signal which produces a thermal response that tends to restore a selected length.

I claim:

1. A dimensional control for a tracer controlled machine tool of the class having a base, a slide being movable on said base, a tool and tracer means carried by said slide and spaced apart thereon, the improvement comprising control means to keep the distance between the tool and tracer means constant by controlling the temperature of the slide, said control means including a rod being substantially temperature insensitive, means anchoring the ends of said rod to the slide, a motion sensitive element mounted on said anchoring means, a heater thermally conductively engaged to the slide, power means connected to the heater and controlled by the motion sensitive element to heat the slide when the distance between the tool and tracer means is reduced.

2. A dimensional control according to claim 1 in which the rod is made of Invar.

3. A dimensional control according to claim 1 in which the motion sensitive element is a strain gauge.

4. A dimensional control according to claim 3 in which the output of the strain gauge controls a power amplifier which functions as the power means.

5. A dimensional control according to claim 3 in which the strain gauge is bonded to a flexure, which flexure is connected to the rod and anchored to the slide, the strain gauge forming a segment of a wheatstone bridge.

6. A dimensional control according to claim 5 in which the output of the strain gauge controls a power amplifier which functions as the power means.

References Cited
UNITED STATES PATENTS 3,427,906   2/1969   Berly _____ 82—14

GIL WEIDENFELD, Primary Examiner

U.S. Cl. X.R.

51—100, 165; 82—34; 83—170